United States Patent Office 3,521,153
Patented July 21, 1970

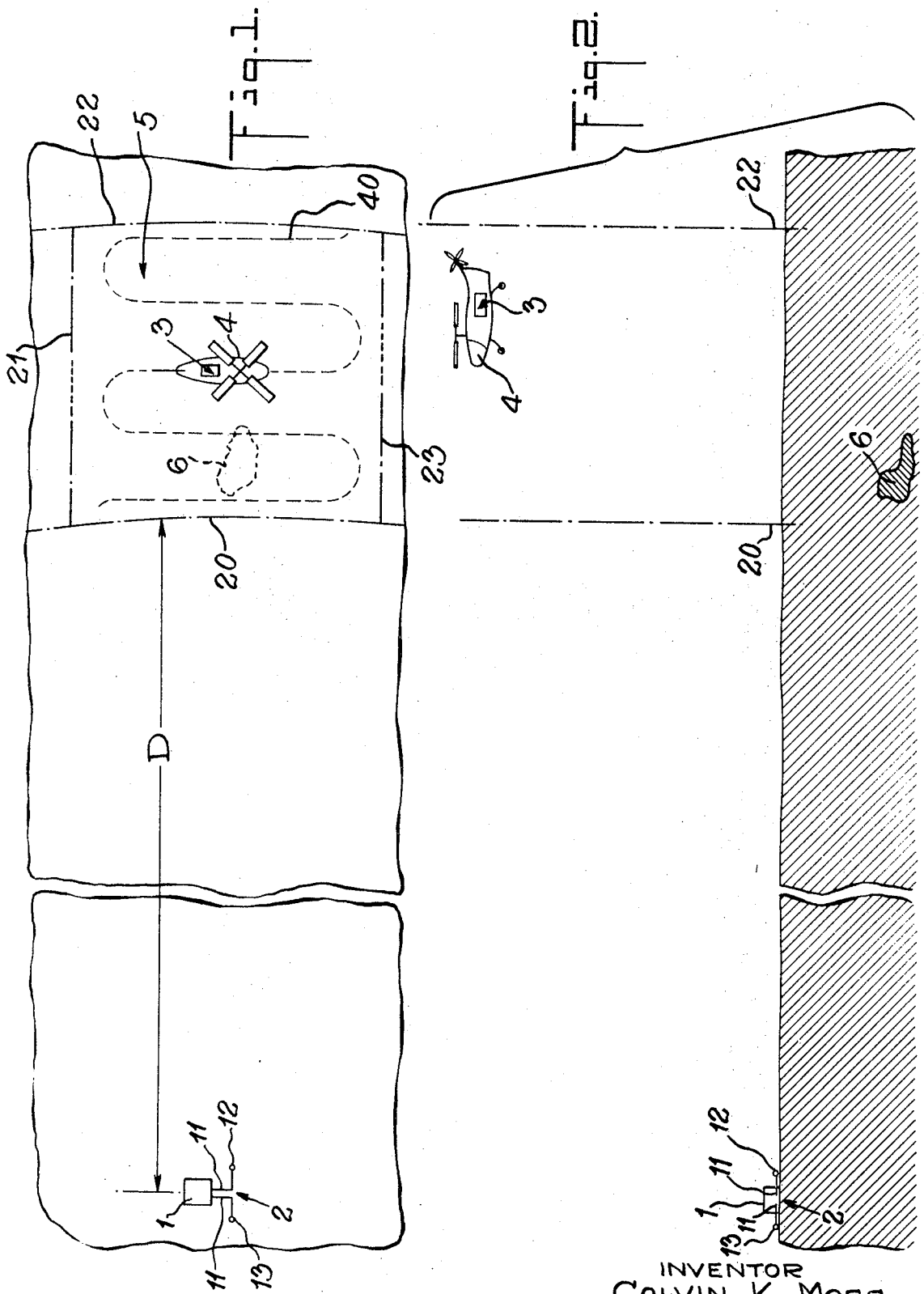

3,521,153
GEOPHYSICAL PROSPECTING WITH ELECTRO-
MAGNETIC WAVES OF EXTREMELY LOW
FREQUENCY
Calvin K. Moss, North Salt Lake City, Utah, assignor to American Smelting and Refining Company, New York, N.Y., a corporation of New Jersey
Filed July 11, 1968, Ser. No. 744,074
Int. Cl. G01v 3/12
U.S. Cl. 324—6           7 Claims

ABSTRACT OF THE DISCLOSURE

Geophysical prospecting by spacing a transmitter, for above ground transmission of electromagntic waves, away from an area to be investigated at a distance which is greater than substantially the distance represented by the equation:

$$D=0.15L$$

in which D is distance in miles and L is the wavelength, in miles, of the transmitted electromagnetic waves, transmitting from the transmitter electromagnetic waves having a frequency less than approximately 3000 cycles per second and also possessing sufficient energy to be received in the area by a receiver and measuring the electromagnetic field at a number of points in the area.

BACKGROUND OF THE INVENTION

Field of the invention

This invention relates to geophysical prospecting for geological anomalies and more particularly to a method of detecting subterranean deposits by determining the effect of such deposits upon an alternating electromagnetic field.

Description of the prior art

Heretofore many attempts have been made to detect subterranean deposits by measuring their effect upon an electromagnetic field. Thus, in one process, a transmitter is placed on one wing tip and a receiver on the other wing wing tip of a monoplane type of airplane and variations in the magnetic field at the receiver are measured while transmitting from the transmitter and flying the plane over an area to be prospected. In another process, a relatively small transmitter is carried into the field on the back of one person in an exploration party and a relatively small receiver on the back of another person in the party; measurements being made on the receiver during transmissions from the transmitter while both transmitter and receiver are stationary and disposed relatively close to each other, i.e. within a distance of approximately 2000 feet of each other. Attempts have also been made to locate deposits by measuring changes in the natural electromagnetic noise in the earth's magnetic field.

The prior art procedures are characterized by a number of disadvantages. Thus, for example, such procedures possess one or more important disadvantages such as nonreproducible and unreliable results, extreme complexity in interpreting the obtained data in terms of subterranean geology, and shallow penetration of the earth. One of the advantages of the present invention is that it overcomes such disadvantages of the prior art. Another extremely important advantage is that the invention affords a procedure for detecting subterranean anomalies which are disposed more than 100 feet and up to more than 1000 feet and as much as 3000 feet or more below the surface of the earth. These and other advantages will become apparent from the following description of the invention.

SUMMARY OF THE INVENTION

Broadly, the invention comprehends a method of geophysically prospecting for subterranean geological anomalies which comprises transmitting electromagnetic waves above ground from a ground based source to an area in which geophysical prospecting is to be conducted, said waves having a frequency less than approximately 3000 cycles per second and also possessing sufficient energy to be received by a receiver for said waves substantially throughout said area to be prospected, such area being located away from said source at a distance which is greater than substantially the distance represented by the value of D in the equation:

$$D=0.15L$$

wherein D is distance in miles and L is the wavelength, in miles, of said transmitted telectromagnetic waves when traveling through the earth's atmosphere, and measuring the electromagnetic field established by the electromagnetic waves received at a plurality of points in said area while transmitting said waves from said source, thereby to determine the presence of subterranean geological anomalies.

The foregoing wave frequency and distance features are critically important in the invention. Thus, the frequencies of the present invention are critically important in detecting deeply disposed underground anomalies. However, the efficiency with which energy can be converted to radiation with the instant frequencies is, relatively, very low. Nevertheless, despite such low efficiency and the relatively vast distance between the transmitter antenna and the receiver, the present invention permits waves of the instant frequency to be usefully employed for the detection of deeply disposed anomalies. Moreover detection of such anomalies is further facilitated because of the fact that the so-called "surface noise" encountered in practicing the invention is relatively low. As already indicated, use of the instant frequencies permit the detection of anomalies disposed more than 100 feet, and up to 1000 feet and as much as up to 3000 feet and more, below the surface of the earth.

It is desirable that the instant waves be controlled (or ordered) waves as opposed to waves possessing random amplitudes or random wave lengths. Thus, the wavelength and amplitude of the instant waves transmitted while making the instant measurements of the electromagnetic field in the area to be prospected, may be constant or substantially constant or confined to a range or either or both the wave length or amplitude may be controlled to possess ordered variations which may have a regular or irregular pattern. While the instant waves may have any frequency or frequencies below approximately 3000 cycles per second, the frequency preferably is below 1000 cycles per second. However, frequencies below approximately 600 cycles per second are especially preferred since they provide an especially favorable relationship between depth of penetration and surface noise. Preferably also, the frequency is more than approximately 50 cycles per second. More preferably the frequency is more than approximately 100 cycles per second and frequencies above approximately 200 cycles per second are still more preferred. Preferably a substantially constant frequency is employed in practicing the invention; a frequency of approximately 400 cycles per second being most preferred.

The distance between the transmitter antenna and the area to be prospected is also critically important in the invention in that such distance should exceed a minimum distance. The minimum distance, however, depends upon the wavelength of the electromagnetic waves employed;

and, for a particular wavelength the minimum distance is approximately the value of D in the previously mentioned equation:

$$D = 0.15L$$

in which D is distance in miles and L is the wavelength, in miles, of the instant electromagnetic waves in traveling through air. Such minimum distance feature of the invention affords reliable and reproducible prospecting results in locating deeply disposed anomalies and greatly simplifies the problem of interpreting the data obtained in terms of the subterranean geology.

The wavelength in miles of the electromagnetic waves when traveling through the atmospheric air can be determined from their frequency; the relationship between wavelength and frequency being given by the equation:

$$L = K/F$$

wherein L is the wavelength in air in miles, F is the frequency in cycles per second and K is the speed of light in miles per second, i.e. 186,000 miles per second. Thus, for example, electromagnetic waves having a frequency of 3000 cycles per second will have a wavelength L in air given by the equation:

$$L = \frac{K}{F} = \frac{186,000}{3,000} = 62 \text{ miles}$$

and the value of the distance D for such wavelength is given by the equation:

$$D = 0.15L = 0.15 \times 62 = 9.3 \text{ miles}$$

To further illustrate the foregoing equations, electromagnetic waves having a frequency of 50 cycles per second will have a wavelength L in air given by the equation:

$$L = \frac{K}{F} = \frac{186,000}{50} = 3,720 \text{ miles}$$

and the value of the distance D for such wavelength is given by the equation:

$$D = 0.15L = 0.15 \times 3,720 = 558 \text{ miles}$$

Likewise electromagnetic waves having a frequency of 400 cycles per second will have a wave length L in air given by the equation:

$$L = \frac{K}{F} = \frac{186,500}{400} = 465 \text{ miles}$$

and the value of the distance D for such wavelength is given by the equation:

$$D = 0.15L = 0.15 \times 465 = 70 \text{ miles}$$

The distance D corresponds substantially to that distance between the transmitter antenna and a receiver for the waves at which the receiver receives substantially only radiant energy from the transmitter. Such distance between such antenna and receiver can be determined empirically by measuring the strength of the alternating electromagnetic field at the receiver when the latter is moved outwardly away from a position adjacent to the antenna while transmitting from the antenna electromagnetic waves of the frequency to be used in prospecting. As the receiver is moved from the antenna, the strength of the electromagnetic field at the receiver will decrease. The distance D will correspond approximately to that distance between the antenna and the receiver at which the first so-called "break" in the field strength occurs; that is to say, that, as the distance between the antenna and receiver is increased, the distance D will be that distance which corresponds approximately to the distance at which there is a relatively sharp decrease in the rate of decrease in the strength of the field at the receiver.

In the present procedure, the distance between the transmitter antenna and the receiver is extremely large as compared to the distance between the receiver and anomaly, even when the receiver is moved over the area in an airplane or helicopter. As a result of this relationship, the strength of the target field at the receiver (i.e. the secondary electromagnetic field established at the receiver by the secondary, or induced alternating, electromagnetic waves emitted by an anomaly or anomalies when excited by those of the primary waves generated by the transmitter, which travel to the anomaly or anomalies) will be significantly large as compared to the strength of the primary field at the receiver (i.e. the field established at the receiver by those of the primary waves generated by the transmitter which travel through the air directly to the receiver from the transmitter antenna). It will be understood that such primary waves are the instant waves; that is, they are alternating electromagnetic waves having a frequency below 3000 cycles per second and are transmitted from the transmitter with sufficient energy (i.e. amplitude) to travel from the transmitter through the air directly to a receiver and to be received and measured by the receiver throughout an area to be prospected and which area is disposed at a distance from the transmitter, which is more than the minimum distance of the invention. It will be further understood that the relationship between the primary field and the target field will be unchanged by changes in the energy possessed by the primary waves. Thus, a given anomaly which is detected by the instant procedure at a distance which is just beyond the minimum distance from the transmitter for the particular frequency employed, will be detected at any greater distance from the transmitter with primary waves of the same frequency, when the primary waves are directed from the transmitter to the receiver with sufficient energy (i.e. amplitude) to be detected by the receiving apparatus at such greater distance.

Accordingly, in practicing the invention, the area to be prospected may be disposed at any distance from the transmitter beyond the minimum distance for the wave frequency employed. Preferably, taking into consideration size and power requirements of the transmitter, the area to be prospected is located at a distance from the transmitter which is in the range between the minimum distance for the particular frequency employed and approximately 1000 miles from the transmitter antenna when employing frequencies in the preferred range of 50 to 3000 cycles per second. Where desired, and especially where it is desired to practice the invention with a relatively small transmitter by moving the transmitter for such preferred frequencies from place to place, the area to be prospected may be disposed within a distance which extends 500 miles beyond the minimum distance of the invention for the frequency involved. However, if desired, such extended distance may extend as little as 100 miles or less down to 5 miles or less beyond the minimum distance of the invention.

The alternating electromagnetic field measured at the receiver in the area to be prospected in accordance with the instant procedure is the resultant field established at the receiver by the primary field and, if any, the target field. In practicing the invention, the field at the receiver may be measured in any appropriate manner. Thus, for example, field measurement may be made by measurements determining any one or more or all of the following elements of the field: either or both the amplitude or direction of any of the three orthogonal components of the electromagnetic or electrical vectors of said resultant field; either or both the amplitude or direction of any one or more of the resultants of such three orthogonal components, which lie in the three orthogonal planes containing such three components; the said electromagnetic or electrical vectors per se; and change of phase between any of such components or resultants of either or both of such electromagnetic or electrical components, or change of phase in any one of such components or resultants of such components as compared to a reference which may be the transmitter itself but which is preferably a local oscillator oscillating at the same frequency as the transmitter. Of such measurements, it is preferred to make any of the various magnetic vector measurements or phase change measurements; and, of such preferred measurements, it is more preferred to measure the amplitude and direction of the horizontal components or the resultant of the horizontal components of such magnetic vector, or such change in phase in any of the components or resultants of such magnetic components. When convenience and costs are not important considerations, it is preferred, at present, to measure said three orthogonal components of the magnetic vector of the resultant field at the receiver together with changes in phase in each of said three components. However, for greatest convenience and economy in practicing the invention, it is, at present, most preferred to measure the resultant of the horizontal components of the magnetic vector of the resultant field at the receiver. It will be understood that, in practicing the present process, a resultant can be measured directly or it may be measured indirectly by measuring its components; and, in that components can likewise be measured directly or they may be measured indirectly by measuring their resultant.

It will also be understood that, in measuring such resultant field in accordance with the invention, the resultant field will coincide with the primary field at the receiver when no anomaly is contributing to the field. In addition, when the resultant field does not coincide with the primary field, the difference is due to the presence of a secondary or target field. Thus, when the resultant field is measured at more than one point, changes in magnitude of the measurement are indicative of the presence of an anomaly. Accordingly, in practicing the invention, the resultant field is measured at a plurality of points in the area to be prospected to determine the presence of anomalies. Moreover, in measuring the resultant field at such plurality of points, the specific character of the changes in amplitude and direction of the magnetic or electrical vectors of the field, or of their components or of the horizontal or vertical resultants of such components, are indicative of the depth of the geological anomaly. Practice of the invention determines the presence of underground geological anomalies having different electrical properties from those of the surrounding earth, especially anomalies having higher conductivities than the surrounding earth such as, for example, conductive ore deposits, faults, shear zones, saline waters and other conductive geological phenomena. The invention is particularly advantageous in determining the presence of conductive underground anomalies representative of subterranean ore deposits, and especially conductive sulfide mineral deposits.

In practicing the invention, the situs of the transmitter may be selected before selection of the area to be prospected and such procedure may be advantageous where the area to be prospected extends upwards of one thousand miles or more from the transmitter. Preferably, however, the area to be prospected is selected and the transmitter is located with respect thereto in accordance with the invention; such procedure being especially preferred in exploring areas which extend less than 500 miles beyond the instant minimum distance, and particularly for areas extending up to 100 miles beyond such minimum distances. Also, in practicing the invention, measurement in the area may be made in any desired manner with an appropriate receiver. Thus, for example, measurements may be made while carrying the receiver in any appropriate manner above ground in the area or measurements may be made at a plurality point in the area while the receiver is stationary. Preferably, measurements are made at a plurality of points in the area while carrying the receiver above ground in an airplane or a helicopter.

A transmitter of any appropriate capacity and construction may be used in practicing the invention; and, the antenna therefore may have any suitable configuration. Thus, for example, the antenna may be loop type or dipole type construction. One or more antennas of the latter type antenna is at present preferred; a single dipole type antenna having its ends grounded in the earth being at present most preferred.

A received of any appropriate construction, and sensitivity may likewise be used in practicing the invention. For example, in measuring the various aforementioned aspects of the electrical vector of the resultant field, the receiver may comprise a condenser, one of the plates of which is a conventional antenna and the other plate being a means serving as a ground. Such antenna may be a conventional rod antenna and the ground means may be the earth or it may be the metal surface of a helicopter or other suitable means where the receiver is being flown above ground while making the instant field measurements. In measuring the various aforementioned aspects of the magnetic vector of the resultant field, a conventional coil type receiver is preferred; the area of the coil and the number of its turns being selected to afford the desired sensitivity in the receiver.

The invention is further illustrated in the accompanying drawings and examples. It should be understood, however, that the drawings and examples are given for purposes of illustration and that the invention in its broader aspects is not limited thereto.

BRIEF DESCRIPTION OF THE DRAWINGS

In the drawings:

FIG. 1 is a plan view, diagrammatic in nature, illustrating the preferred embodiment for practicing the invention.

FIG. 2 is a side view of the embodiment illustrated in FIG. 1.

DESCRIPTION OF THE PREFERRED EMBODIMENTS

Figure 3:
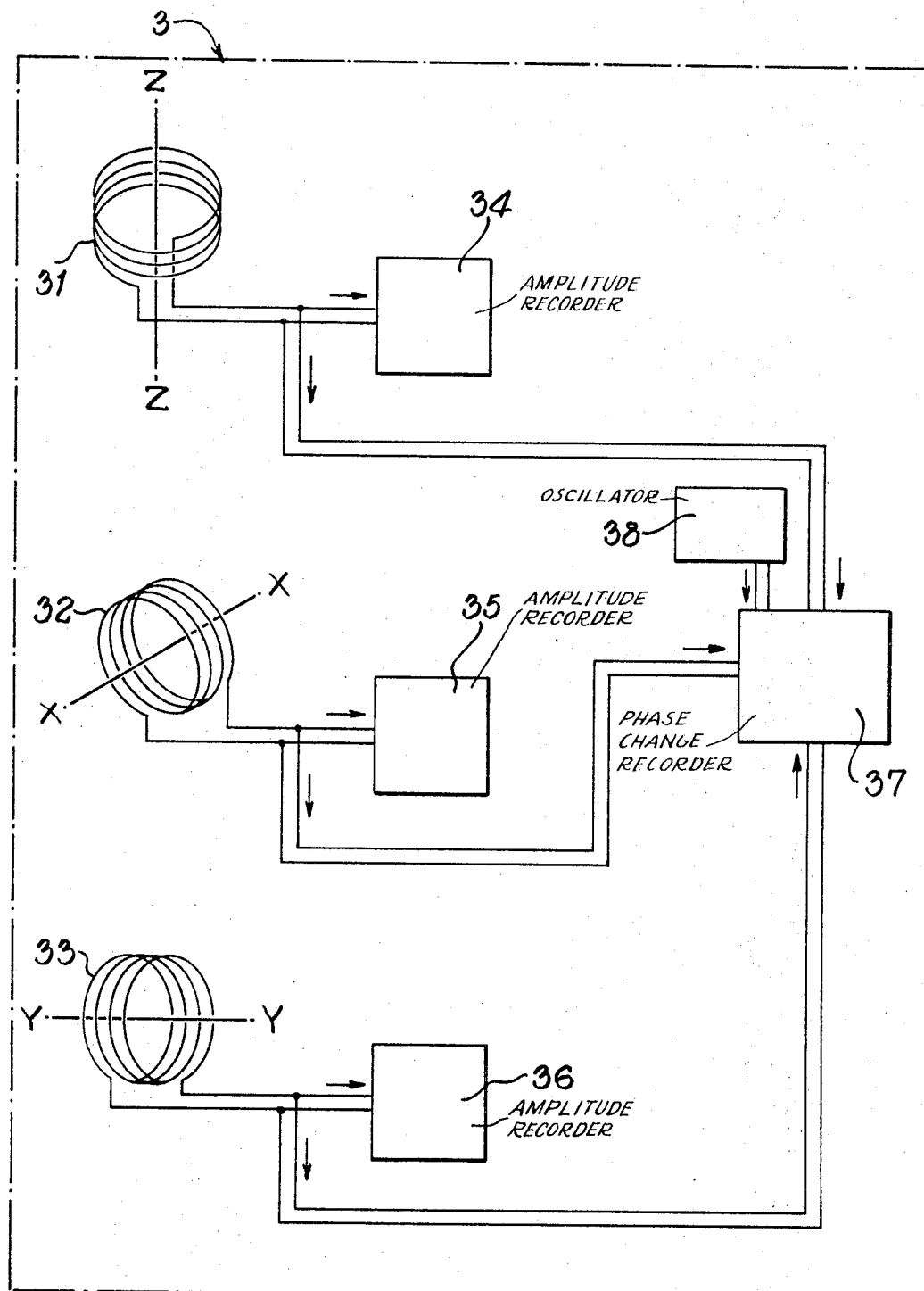
FIG. 3 is a partially perspective view diagrammatic in nature, illustrating the preferred receiver for practicing the invention.

Referring to the drawings, FIG. 1 illustrates the position of the apparatus in practicing the invention and the preferred embodiment of the invention. The numeral 1 represents a transmitter provided with antenna 2 for generating and transmitting the instant electromagnetic waves to an area, 5, which is to be prospected. The numeral 3 represents a receiver for receiving the transmitted waves; the receiver being shown mounted in helicopter 4 which is navigated over the earth over area 5 in prospecting for anomaly 6. The output end of transmitter 1 is coupled to antenna 2 by means of cables 11; antenna 2 being insulated along its length to shield it from the earth. Preferably, the ends of the antenna are grounded to the earth as by means of contacts 12 and 13. Numerals 20, 21, 22 and 23 represent the boundaries of area 5; the latter being disposed away from antenna 2 by a distance greater than substantially the distance D.

As illustrated in FIG. 3, the receiver 3 is a receiver for measuring the magnetic vector of the electromagnetic field at the receiver. The latter is provided with coils 31, 32 and 33 mounted in the helicopter with their axes (Z, X and Y respectively) disposal normal to each other and also with the axis Z of coil 31 disposed substantially vertically and the axis Y of coil 33 aligned with the longitudinal axis of the helicopter, when the helicopter is in position for measuring the signals received by the receiver. The coils 31 through 33 are connected to conventional measuring instruments 34 through 36, respectively, for measuring and recording the amplitudes of the signals from the coils; and each of the coils is also connected to a conventional measuring instrument 37 for measuring and recording changes in phase of the signals received from the coils as compared to local reference oscillator 38 which is oscillated at the same frequency as the transmitter. If desired, only one of the coils may be used when only one component of the magnetic vector is to be measured; or any two of the coils may be used if it is desired to measure two components of the magnetic vector or if it is desired to measure the resultant of any two of such components. Also, if desired, measurement of change of phase may be dispensed with or the change of phase of the signal from one or more or all of the coils may be measured.

Practice of the invention is illustrated by the following procedure. Electromagnetic waves having a frequency of 400 cycles per second are generated in transmitter 1 and broadcast through the air from antenna 2 as shown in FIG. 1; the waves being generated with sufficient amplitude to be detected and measured by the receiver 3 while the latter is being carried in the air anywhere in the area 5 by helicopter 4. The area 5 is disposed more than approximately 70 miles from antenna 2. The helicopter is navigated over path 40 in an appropriate manner so that its course (heading) and its height and position with respect to the ground in area 5 are known when signals from the coils 31 through 33 are measured and recorded in instruments 34 through 37. Oscillator 38 is oscillated at a frequency of 400 cycles per second. Measurements are made at a plurality of points on path 40 in area 5 while the helicopter is navigated on path 40 at a known speed and altitude and a known course for a known time from a known starting point so as to correlate the position of the coils and the azimuth of axes X and Y of coils 32 and 33 respectively, with the signals from the three coils when such signals are being measured and recorded by instruments 34 through 38. The magnitude and direction of the magnetic vector at the receiver and the phase of the field at the receiver, as compared to the phase of oscillator 38, at the various measuring points are measured and recorded and the measurements are noted on a map of area 5. Differences between the various measuring points in the values of the measurements indicate the presence of an anomaly; and, the magnitude and direction of the magnetic vector at the measuring points or changes in the values of the magnitude and direction of the magnetic vector between the measuring points indicate the location and depth of the anomaly in area 5. Subterranean anomalies in area 5 which are disposed up to 100 feet or more and as much as up to 1000 feet or more and, depending on the electrical conductivity of the anomaly, as deep as 3000 feet or more below the surface of the earth, are detected with relative ease when such values are noted on a map of the area. Satisfactory results are also obtained when either or both the magnitude or phase of one or both of the horizontal components of the magnetic vector are measured.

What is claimed is:

1. A method of geophysically prospecting for subterranean geological anomalies which comprises radiating primary electromagnetic waves above ground from a ground based source throughout an area in which geophysical prospecting is to be conducted; said waves having a frequency less than approximately 3000 cycles per second and also possessing sufficient energy to establish a primary electromagnetic field which can be received directly by a receiver throughout said area, said area being located away from said source at a distance which is greater than substantially the distance which is represented by the value of D in the equation:

$$D=0.15L$$

wherein D is distance in miles, and L is the in-air wavelength, in miles, of the electromagnetic waves transmitted from said source, and measuring the electromagnetic field established by the electromagnetic waves received at a plurality of points distributed throughout said area while radiating said waves from said source and maintaining said source stationary, thereby to determine the presence of subterranean geological anomalies which are remote from said source and which underly said area.

2. A method according to claim 1 in which the frequency of said waves is higher than approximately 50 cycles per second and said antenna means is a dipole antenna with its poles grounded to the earth.

3. A method according to claim 2 in which said area is disposed within 1000 miles of said source of said waves.

4. A method according to claim 3 in which the frequency of said waves is approximately 400 cycles per second.

5. A method according to claim 4 in which said area is disposed more than approximately 70 miles from said source of said waves.

6. A method according to claim 2 in which the frequency of said waves is in the range of 100 to 600 cycles per second and said area is disposed within a distance which extends up to 500 miles beyond the distance represented by said distance D.

7. A method according to claim 6 in which a horizontal component of said field is measured at said points.

References Cited

UNITED STATES PATENTS

| 1,676,779 | 7/1928 | Herr | 324—6 |
| 1,792,910 | 2/1931 | Jakosky | 324—6 |
| 1,818,331 | 8/1931 | Jakosky | 324—6 |
| 2,172,688 | 9/1939 | Barret | 324—6 |
| 2,268,106 | 12/1941 | Blau | 324—6 |
| 2,731,596 | 1/1956 | Wait et al. | 324—6 |
| 2,992,325 | 7/1961 | Lehan | 324—6 XR |

GERARD R. STRECKER, Primary Examiner

U.S. Cl. X.R.

324—4